3,259,216
BRAKE COOLING SYSTEM
Frederick C. Klaus, Lockport, and Jackson C. Medley, East Peoria, Ill., assignors to Caterpillar Tractor Co., Peoria, Ill., a corporation of California
Filed Aug. 18, 1964, Ser. No. 390,392
7 Claims. (Cl. 188—264)

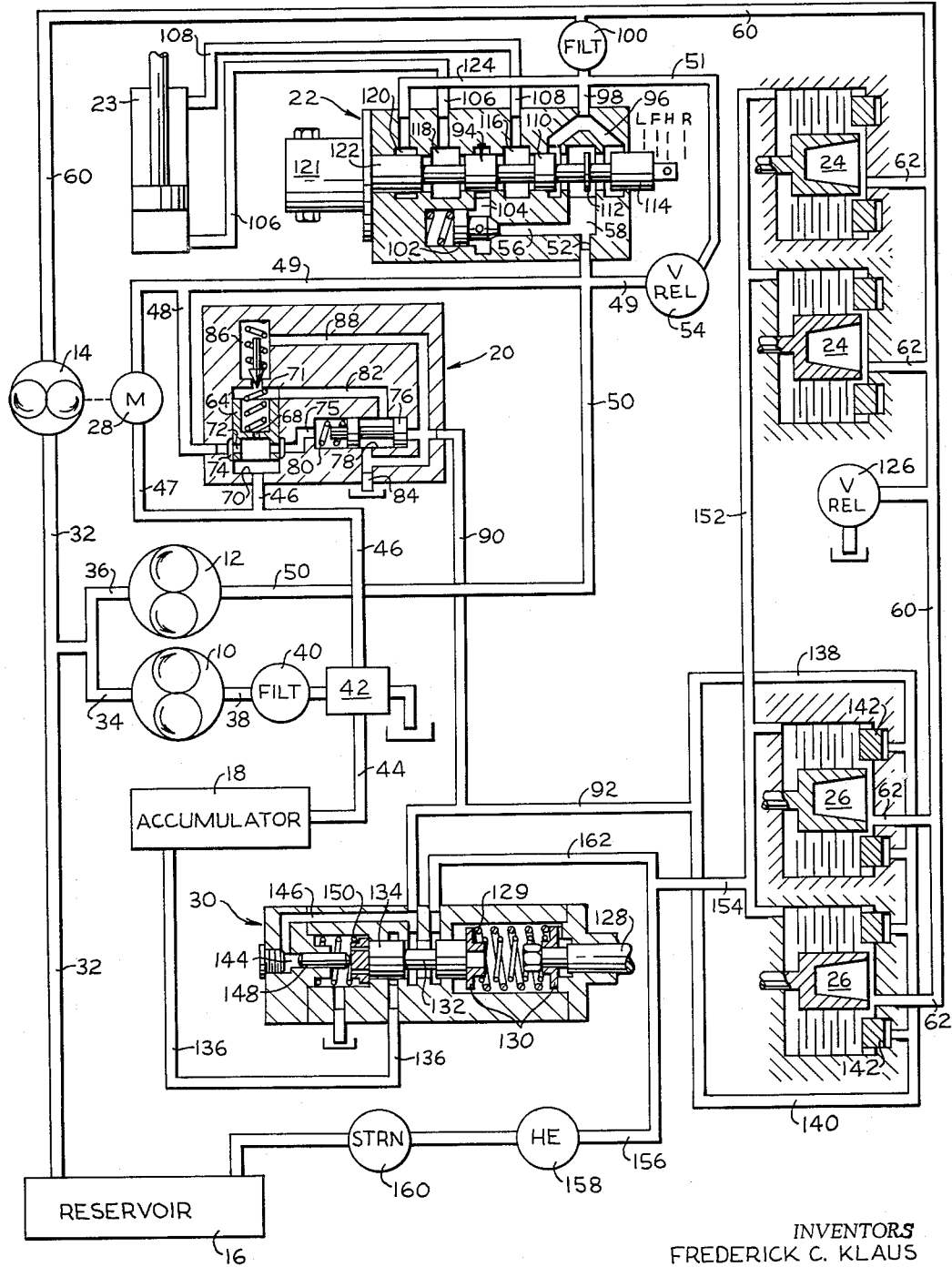

This invention relates to a brake cooling system and more particularly to a system which supplies varying quantities of cooling fluid to the brakes with the greatest quantity being supplied during periods of maximum braking effort.

Increasingly greater braking capacities occasioned by larger and faster vehicles have made it necessary to supply power operated disc brakes which have the advantage of being able to dissipate a greater amount and rate of kinetic energy than the more common shoe-type brakes. The amount of retardation of motor vehicle brakes is affected by several factors, some of which are: the force exerted on the braking surfaces; the weight being retarded; the radius of the wheel; radius of the brakes; the coefficient of friction between the braking surface; and the coefficient of friction between the tire and the road.

Retarding or bringing a vehicle to a halt requires the brakes to absorb the kinetic energy of the vehicle wherein such energy is converted into heat which is absorbed by the brakes. Thus the temperature of the brakes is greatly increased causing a reduction in the coefficient of friction between the braking surfaces and consequent reduction in the rate of retardation. Although the rate of kinetic energy that is absorbed by disc brakes is greater than the shoe-type brakes, it is still necessary to provide means for cooling disc brakes and to preferably increase the rate of cooling when maximum braking effort is desired.

This invention proposes a structure designed to provide a system, responsive to the braking effort, which increases coolant flow to the brakes.

The brake cooling system of this invention is shown for purposes of illustrating one environment in which it can be used as forming part of the hydraulic circuit for operating the auxiliary power devices provided on the vehicle. This invention provides a fluid pressurizing means in the hydraulic circuit which is conditioned for operation when the brakes of the vehicle are energized, with the output of such means being utilized for cooling the brakes. More particularly, this invention provides a valve mechanism responsive to the brake actuating fluid which diverts a portion of the pressure fluid in the hydraulic circuit to a hydraulic motor whose output is connected to a hydraulic pump which supplies additional cooling fluid to the brakes.

Accordingly it is an object of this invention to provide a new and improved brake cooling system.

It is another object of this invention to increase the quantity of coolant flow to the brakes at the time of greatest need.

A further object of this invention is to provide a plurality of fluid pressurizing devices which are selectively available for cooling the brakes and operating auxiliary power devices incorporated on the vehicle.

With the foregoing objects in view, together with such other objects and advantages which may subsequently appear, the drawing considered with the following description is one form which the invention may take in practice.

The major components of the preferred form of this invention shown in the drawing include conventional hydraulic pumps 10, 12 and 14 each of which withdraw fluid from a reservoir 16. Fluid pressure from pump 10 is conventionally controlled for delivery to an accumulator 18 or a control valve mechanism 20. Fluid pressure from pump 12 is delivered to a valve 22 which is selectively operable to actuate a jack mechanism 23 for raising and lowering a vehicle dump body, for example. Suitable disc brakes 24 for the forward wheels, and 26 for the rear wheels, are shown associated with the hydraulic system. The pump 14 is arranged to be driven by a hydraulic motor 28 being selectively conditioned for operation by the control valve 20. A brake control valve 30, mechanically interconnected to the brake pedal of the vehicle, operates to control the flow of pressure fluid from the accumulator 18 to annular disc engaging pistons forming part of the rear brakes. The valve 30 is hydraulically interconnected to the control valve 20 so that the motor 28 is caused to operate whenever the brakes are applied and pump 10 is in communication with conduit 46.

The most important feature of the above described system pertains to the functional relationship of the control valve 20 and the hydraulic motor 28 for operating the pump 14 so that this pump provides an increased quantity of cooling fluid flow any time the rear brakes 26 are actuated under the above described conditions.

Another feature of this invention resides in the fact that the valve 22 not only functions to actuate the jack mechanism 23 for the dump body but permits cooling fluid to flow to the brake mechanisms 24 and 26 with such coolant flow being reduced when the jack mechanism is being actuated. It is to be realized that actuation of this jack mechanism usually takes place when the vehicle is at a standstill or moving very slowly; therefore, the amount of kinetic energy to be absorbed by the brakes is zero or is at a minimum.

In particular, the illustrated brake cooling system comprises a conduit 32 and branch conduits 34 and 36 providing communication between the inlets of the pumps 10, 12 and 14 with the reservoir 16. The pumps 10 and 12 are driven by the vehicle engine thus they may be considered to be continuously operating. Fluid is discharged by the pump 10 through a conduit 38, flows through a filter 40 of suitable construction, and an accumulator charging valve 42. Pressure fluid delivered to the accumulator charging valve 42 is delivered to the accumulator 18 by a conduit 44 until such time a predetermined value of pressure is reached by the accumulator causing the valve 42 to interrupt flow to the accumulator and direct flow of pressure fluid to a conduit 46 which is connected to the control valve 20. During those periods when the brakes are actuated, the valve 30 supplies pilot pressure to the valve 20 which operates to condition the latter to cause pressure fluid in the conduit 46 to be directed through a conduit 47 effecting operation of the hydraulic motor 28 which has the discharge thereof connected to the inlet port 52 of the valve 22 by a conduit 49. When the brakes are released, the valve 20 is conditioned to direct the pressure fluid from the conduit 46 to the conduit 48, which communicates with the conduit 49, thus by-passing the hydraulic motor 28. The conduit 49 is connected to a pressure relief valve 54 which permits flow of pressure fluid around the valve 22 to a conduit 51 so that it may be utilized for cooling the brakes when the valve 22 is adjusted to effect operation of the hoisting jack mechanism 23 and the pressure at inlet port 52 builds up sufficiently through full extension or extreme loading of the jack mechanism to overcome the relief setting of valve 54.

Pressure fluid from the pump 12 is discharged into the conduit 50 and communicated to the port 52 of the valve 22 and to internal passageways 56 and 58 formed in the body of this valve.

Fluid pressurized by the pump 14 is communicated to the forward and rearward brakes 24 and 26, respectively, by a conduit 60 and branch conduits 62 with the fluid in the conduit 60 constituting the cooling fluid flow to the brakes.

The control valve 20 comprises a tubular spool 64 having a transverse wall bored to define an orifice 68 operating to establish a pressure difference on the opposite side of the transverse wall. This spool is biased by a spring 71 urging the spool against the shoulder 70 of the bore within which the spool is reciprocably mounted. The spool is provided with a plurality of circumferentially spaced radial holes 72 which permit pressure fluid communicated to the lower end of the valve to be discharged to the conduit 48. The valve bore is formed with an annular groove 74 which insures communication of the holes 72 with the conduit 48 over a limited range of reciprocable movement of the spool 64. A spool valve 76 is reciprocably mounted in a bore 78 with the spool being biased to the right, in the position shown, by a spring 80. Communication between the bore 78 and the spring cavity of the valve 64 is effected by a passage 82 which directs fluid passing through the orifice 68 to the bore 78. Fluid discharged to the bore 78 is communicated to the tank through a port 84. The spool 76 is effective to equalize the pressure across the orifice 68 permitting the spring 71 to bias the spool 64 downwardly into engagement with the shoulder 70 when the spool 76 is shifted to the left blocking the passageway 82.

The control valve 20 also includes a spring biased pressure relief valve 86 which by-passes pressure fluid flowing through the orifice 68, when the passageway 82 is blocked, through another passageway 88 which communicates with the discharge port 84. Thus fluid pressure in excess of the setting of relief valve 86 is returned to the reservoir preventing overpressuring of the conduit 47 and motor 28. Shifting of the spool 76 to the left against the bias of the spring 80 is caused by pressure fluid admitted to the right hand end of the bore 78 by a conduit 90 which is in communication with a conduit 92 forming the part of the fluid circuit for distributing the pressure fluid from the accumulator 18 to the rear brakes 26.

Extension and retraction of the dump body jack mechanism 23 is accomplished by the valve 22 which includes a manually operable reciprocable spool 94 having four adjusted positions indicated by the letters L, F, H and R, being respectively the lowering position, the float position, the hold position and the raised position of the jack. The internal passageway 58 is in communication with a branched chamber 96 when the spool 94 is in the hold position, which is the position illustrated in the drawing. Fluid communicated to the chamber 96 flows through a conduit 98, through a suitable filter 100 for distribution to the brakes by the conduit 60. A check valve 102 is provided in the internal passageway 56 and controls the admission of fluid from the port 52 to another passageway 104 which is brought in communication with conduits 106 or 108 that are connected to a hoisting hydraulic jack mechanism. When the spool 94 is shifted to the right in order to extend the jack mechanism, spool lands 110 and 112 block communication between the passageway 58 and the chamber 96 while establishing communication between the passageway 104 and the conduit 106 permitting fluid pressure to operate the check valve 102 against the bias of its spring allowing pressure fluid to be admitted to the head end of the jack causing consequent extension of the jack. Return of the spool 94 to the hold position blocks the passageway 104 and establishes communication between the passageway 58 and the chamber 96 permitting fluid to flow through the conduits 98 and 60 thereby supplying cooling fluid to the brakes 24 and 26. In a similar manner, when spool 94 is shifted to the left or lower position communication between the passageway 58 and the chamber 96 is blocked by the land 112 and the land 114 thus causing actuation of the check valve 102 thus permitting pressure fluid to flow through the passageway 104 and through the conduit 108 which is connected to the rod end of the hoist jack thereby causing retraction of the jack. Normally, when the vehicle is in motion, spool 94 will be in the float position. Such position may be either manually effected or automatically returned thereto from the lower or "power down" position by a conventional spring-return and detent mechanism 121. In this condition passage 58 and chamber 96 are in communication through the reduced diameter of spool 94 between lands 110 and 112 permitting fluid flow to brake cooling conduit 60. Exhaust fluid from the head end of the jack mechanism is communicated with the brake cooling conduit 60 through displacement of land 122 and interconnection of chambers 118 and 120 and the weight of the vehicle body causes retraction of the jack. Passage 104 is uncovered at this time and the check valve 102 will open slightly to permit pressure fluid entry to the rod end of the jack to fill the low pressure area occasioned by such retraction.

The annular grooves in the valve 22 are related to the spool lands so that fluid exhausted from the jack, whether it be during the extension or retraction, is made available for cooling the brakes by being communicated to the conduit 60 by the conduit 98. Assuming the spool 94 is shifted to the right, that is the raised position of the jack, fluid discharged from the rod end of the jack into the conduit 108 flows to the chamber 96 since the land 110 is displaced a sufficient distance to the right to provide communication between the groove 116 and the chamber 96 with such fluid being conducted to the brakes by the conduit 98 and the conduit 60. When the spool 94 is shifted to the left, fluid returned to the valve 22 from the jack mechanism by the conduit 106 flows in the groove 118 to a port 120 which is uncovered by the land 122. The port 120 communicates with the conduit 98 by a conduit 124 thus permitting the fluid exhausted from the jack mechanism during retraction thereof to be available to provide cooling of the brakes.

The brakes 24 and 26 are designed to maintain a maximum value of pressure which is dictated by the brake housing sealing arrangement. In order to preclude a value or pressure higher than can be effectively retained by the seals, pressure relief valve 126 is connected to the conduit 60 and is operative to return fluid to the tank in the event the pressure in the conduit 60 is too high.

Actuation of the rear brakes 26 is effected by the operation of the brake control valve 30 which includes an operating rod 128 interconnected in any suitable manner to the brake pedal of the vehicle such that when the brake pedal is depressed the rod 128 is moved to the left into the body of the valve 30 transferring such motion to springs 129 located between circular plates 130, one of which is connected to rod 128 and the other to a spool 132, reciprocably mounted in a bore 134 formed in a valve body. Pressure fluid from the accumulator 18 is communicated to the valve 30 by a conduit 136 and pressure derived from the conduit 136 is distributed to the rear brakes 26 by a conduit 92 and the conduits 138 and 140 actuating annular pistons 142 on each of the rear brakes. Pressure fluid is communicated to a cavity 144 of the brake control valve 30 by a passageway 146 in order to urge a small piston 148 in abutting engagement with the left hand face or end of the spool 132 with the force applied by the piston 148 being effective to position the spool 132 so that proportioning of the brake actuating pressure is accomplished. In addition to the force imparted by the piston 148 to the spool 132 moving it to the right, a spring 150 is also provided to urge the spool 132 to the right.

Return of cooling fluid, communicated to each of the brakes by the conduits 60 and 62, to the reservoir 16 is provided by conduits 152, 154 and 156 which are interconnected to a heat exchanger 158 and a strainer 160. A branch line 162 is in communication with the conduit 156 and the bore 134 of the brake control valve 30 in order to exhaust the fluid pressure applied to the annular pistons 142 when the brake is released which returns the spool 132 to the position shown in the drawings. Under these circumstances when the brake is released, the pressure fluid flows through the conduits 138 and 140, through the conduit 92 into the bore 134 whence it flows through the conduit 162 back to the reservoir 16.

In describing the operation of this invention, it will first be assumed that the vehicle is loaded and travelling at a constant rate of speed. Under these conditions, no braking effort is exerted and the spool 132 blocks flow of fluid from the accumulator 18 through the conduit 136, therefore no pressure fluid is communicated to the conduit 90. The spool 76 of the control valve 20 is in the position illustrated in the drawing and the pumps 10 and 12, since they are connected to the engine of the vehicle, are discharging pressure fluid in the conduits 38 and 50, respectively. When the accumulator is at its desired pressure, the accumulator charging valve 42 diverts the output of the pump 10 to the conduit 46 pressurizing the lower end of the spool 64 which effects movement of the spool against the bias spring 71 thereby establishing communication between the holes 72 and the conduit 48. The orifice 68 in the transverse wall of the spool 64 establishes a pressure difference across the transverse wall which maintains the spool 64 in the position shown in the drawing with the fluid passing through the orifice 68 communicating with the passageway 82 and the passageway 84 for return to the tank. The conduit 48 delivers the pressure fluid via conduit 49 to the passageway 58, to the chamber 96, since the spool at this time will be adjusted to its float position, through the conduit 98 to the conduit 60 and then to the brakes 24 and 26 through the small branch conduits 62.

The discharge of the pump 12 is conducted by the conduit 50 to the passageway 58 where it also flows through the chamber 96, the conduit 98, the conduit 60 and to each of the brakes in the same manner as above described.

It is to be noted when the holes 72 are in communication with the conduit 48 that the pressure fluid from the pump 10 is shunted to the downstream side of the motor 28 thus rendering the motor inoperative. It is seen that under the above described conditions wherein no braking effort is desired, the output of the pumps 10 and 12 is communicated to the forward and rearward brakes 24 and 26 constituting coolant flow.

When it is desired to effect braking of the vehicle, depression of the brake pedal by the operator moves the rod 128 of the brake valve 30 to the left transferring such motion through the spring 129 to the spool 132 to establish communication between the conduit 136 and the conduit 92 directing pressure fluid through the conduits 138 and 140 to the annular pistons 142 thus actuating the brakes. At this time a portion of the pressure fluid in the conduit 92 is communicated to the right hand end of the spool 76 by the conduit 90 causing the spool 76 to shift to the left against the bias of the spring 80 blocking the passageway 82 in the control valve 20. This causes the pressure on the opposite sides of the transverse wall of the spool 64 to become equalized making the spring 71 effective to seat the spool 64 against the shoulder 70 thus blocking the conduit 48 so that all of the pressure fluid in the conduit 46 passes through conduit 47 and the motor 28 therefore effecting energization of the motor. With the motor 28 operating, the pump 14 pressurizes fluid derived from the reservoir 16 by the conduit 32 discharging the fluid in the conduit 60 for distribution to each of the brakes by the conduits 62. The cooling fluid to each of the brakes is returned to the reservoir 16 by the conduits 152, 154 and 156.

In the event the spool 94 of the valve 22 were to be actuated in order to extend the hydraulic jack mechanism, the spool 94 is shifted to the right, to the position indicated by the letter R, and the lands 110 and 112 block communication between the passageways 58 and the chamber 96 opening the check valve 102 and allowing pressure fluid from the line 50 to be communicated to the passageway 104, through the chamber 118, and through the conduit 106 causing extension of the jack. The fluid exhausted from the jack is returned to the valve 22 by the conduit 108 to the chamber 116, and to the conduit 60 for distribution to each of the brakes. Under this condition precedence of the hoist jack operation over brake cooling is allowed through communication of hoisting pressure at inlet port 52 of valve 22 via conduits 50, 49 and 48 and annular groove 74 and passage 75 in valve 20 to the spring cavity in bore 78. In this manner hoist jack operating pressure supplements the force of spring 80 against the left hand end of valve spool 76 to overcome the opposing force of the brake actuating pressure supplied through conduit 90 to the right hand end of the spool. This causes spool 76 to be urged rightwardly as shown in the drawing to communicate passage 82 with port 84 allowing the fluid passing through orifice 68 to return to the tank. Thus the pressure differential across the transverse wall of spool 64 is re-established and upward movement of the spool is effected by fluid pressure from conduit 46 to establish communication between the holes 72 and conduit 48 and by-pass fluid pressure around hydraulic motor 28. This action causes motor 28 and pump 14 to stop and the fluid pressure from pumps 10 and 12 becomes available at inlet port 52 of valve 22 for the hoist function.

Similarly, if the jack mechanism were to be retracted while the rear brakes were actuated, valve mechanism 20 would function as described above to stop motor 28 and pump 14 but the spool 94 would be shifted to the position indicated by the letter L and pressure from the pump 12 would be effective to cause opening of the check valve 102 since the land 112 and the land 114 would block communication between the passageway 58 and a chamber 96. Pressure fluid from the passageway 104 would enter the chamber 116 and the conduit 108 which would retract the jack and the fluid exhausted from the opposite end of the jack would flow through the conduit 106 to the chamber 118 which is now in communication with the port 120 and the conduit 124 since the land 122 would be shifted a sufficient distance to the left to open the port 120. The flow of fluid communicated to the conduit 124 would flow to the conduit 98 through the filter 100 and then to the conduit 60 where it would be distributed to each of the brakes by the conduits 62. If the actuator for spool 94 is released at this time to allow the spool to be returned rightwardly to the float position by spring-return and detent mechanism 121 all of the above conditions will be met except the communication between passage 58 and chamber 96 is re-established through rightward movement of land 112 allowing fluid pressure to flow to the brake cooling conduit 60 and check valve 102 lifts momentarily to permit oil to fill the rod end of the retracting jack mechanism. Under this condition the pressure communicated from port 52 in valve 22 to the spring cavity in bore 78 of valve 20 is reduced such that brake actuating pressure in conduit 90 urges spool 76 leftwardly to block passage 82 and equalize pressures on opposite sides of the transverse wall in spool 64. The sping 71 will then urge spool 64 downwardly to block communication between holes 72 and conduit 48 and the pressure fluid from conduit 46 will proceed via conduit 47 to re-energize motor 28 which drives pump 14 to supply cooling fluid to conduit 60.

Thus, it is seen that the control valve 20, by being hydraulically interconnected by the conduit 90 with the brake control valve 30 and by conduits 48, 49 and 50 with valve 22, is operative to effect selective operation of the hydraulic motor 28 and the pump 14 to provide additional cooling fluid to the brakes at such times when a maximum amount of cooling fluid flow is required while allowing precedence of the hoist function over brake cooling. In addition, the control valve 22 is so constructed that the fluid exhausted by the hydraulic jack, whether it be during extension or retraction, is made available for the brake cooling circuit.

What is claimed is:

1. A brake cooling system comprising, selectively operable means for establishing communication between a source of pressure fluid and a brake to cause actuation of the brake, fluid pressurizing means for providing cooling fluid flow to the brake, a fluid motor for driving said fluid pressurizing means and operable simultaneously with said selectively operable means, and a valve element operable in response to said selectivey operable means for directing pressure fluid derived from said source to said fluid motor and thus cause operation of said fluid pressurizing means.

2. A brake cooling system comprising, selectively operable brake control valve for establishing communication between a source of pressure fluid and a brake to cause actuation of the brake, continuously operating fluid pumps for maintaining the source of pressure fluid at a desired pressure and for supplying cooling fluid to the brake, an intermittently operable fluid pump for supplying additional cooling fluid to the brake, and valve means operable in response to said brake control valve for effecting operation of said intermittently operable fluid pump.

3. A brake cooling system comprising hydraulically operated vehicle brakes; means for pressurizing fluid for operating said brakes; a valve for permitting the pressurized fluid to be communicated to said brakes; an additional means for pressurizing fluid; a hydraulically operated motor connected to drive said additional fluid pressurizing means; and a valve, operable in response to the actuation of the brakes, for delivering pressure fluid from said pressurizing means to said hydraulic motor to thereby cause operation of said additional pressurizing means and accordingly increase the amount of cooling fluid during such times when the brakes are actuated.

4. A brake cooling system being arranged with a hydraulic circuit which supplies a continuing flow of cooling fluid to the brakes and increases such flow when the brakes are actuated: said system comprising at least one continuously operating fluid pressurizing means; means in communication with said pressurizing means for containing a quantity of the fluid discharged by said pressurizing means under pressure; a plurality of pressure fluid operated brakes; a brake control valve for establishing communication between said containing means and said brakes to thereby effect actuation of said brakes; an intermittently operable fluid pressurizing means; valve for controlling the operation of said last mentioned means comprising a first valve member operable to permit flow of cooling fluid from said continuously operating fluid pressurizing means to said brakes, and a second valve member, deriving a source of pilot pressure from said brake control valve when the brakes are actuated, for causing operation of said intermittently operable fluid pressurizing means having the discharge thereof connected to supply additional cooling fluid to the brakes; and an actuator control valve operable to exhaust flow therefrom to the brake cooling system.

5. A brake cooling system being arranged with a hydraulic circuit which supplies a continuing flow of cooling fluid to the brakes and increases such flow when the brakes are actuated: said system comprising at least one continuously operating pump; an accumulator for containing a quantity of the fluid discharged by said pump; a plurality of pressure fluid operated brakes; a brake control valve for establishing communication between said accumulator and said brakes to thereby effect actuation of said brakes; a hydraulic motor having a pump connected thereto; and a valve, for controlling the operation of said motor, comprising a first valve member operable to permit flow of cooling fluid from said continuously operating pump to said brakes, and a second valve member, deriving a source of pilot pressure from said brake control valve when the brakes are actuated, for causing operation of said motor and the pump connected thereto which supplies additional cooling fluid to the brakes.

6. A brake cooling system being arranged with a hydraulic circuit which supplies a continuing flow of cooling fluid to the brakes and increases such flow when the brakes are actuated: said system comprising a pair of continuously operating pumps; an accumulator being supplied with pressure fluid by one of said pumps, a plurality of pressure fluid operated brakes; said pumps being arranged to supply a constant flow of cooling fluid to said brakes; a brake control valve for establishing communication between said accumulator and said brakes to thereby effect actuation of said brakes; an intermittently operable pump being connected to supply cooling fluid to said brakes; a valve operable in response to the actuation of said brakes for causing operation of said intermittently operable pump and thus supply additional cooling fluid thereto.

7. A brake cooling system comprising an engine driven pump; an accumulator being arranged to be charged with pressure fluid by said pump; a pressure fluid operated brake; a brake control valve for communicating the pressure fluid in said accumulator to said brake; a hydraulic motor and a pump coupled thereto which supplies cooling fluid to said brake; and a pressure fluid control device, including a valve element biased to a first position and movable therefrom to a second position when said brake is actuated, for diverting the flow of said engine driven pump to said hydraulic motor and effect operation of the pump connected thereto to thereby supply cooling fluid to said brake.

References Cited by the Examiner

UNITED STATES PATENTS

| | | | |
|---|---|---|---|
| 3,047,104 | 7/1962 | Schjolin | 188—264 |
| 3,110,378 | 11/1963 | Qualman | 188—264 |

FOREIGN PATENTS 701,725  12/1953  Great Britain.

MILTON BUCHLER, *Primary Examiner.*

G. E. A. HALVOSA, *Assistant Examiner.*